US012765445B2

(12) United States Patent
Thylén et al.

(10) Patent No.: US 12,765,445 B2
(45) Date of Patent: Oct. 20, 2026

(54) SINGULATOR FOR AGRICULTURAL IMPLEMENT, AGRICULTURAL IMPLEMENT AND METHOD OF OPERATING A SINGULATOR

(71) Applicant: Väderstad Holding AB, Väderstad (SE)

(72) Inventors: Lars Thylén, Linköping (SE); Gert Gilstring, Vadstena (SE); Jörgen Dahl, Ödeshög (SE)

(73) Assignee: Väderstad Holding AB, Väderstad (SE)

( * ) Notice: Subject to any disclaimer, the term of this patent is extended or adjusted under 35 U.S.C. 154(b) by 334 days.

(21) Appl. No.: 18/576,844

(22) PCT Filed: Jul. 5, 2022

(86) PCT No.: PCT/EP2022/068652

§ 371 (c)(1),
(2) Date: Jan. 5, 2024

(87) PCT Pub. No.: WO2023/280888

PCT Pub. Date: Jan. 12, 2023

(65) Prior Publication Data

US 2024/0306532 A1 Sep. 19, 2024

(30) Foreign Application Priority Data

Jul. 7, 2021 (SE) .................................... 2150900-5

(51) Int. Cl.
*A01C 7/04* (2006.01)

(52) U.S. Cl.
CPC ............ *A01C 7/0443* (2023.05); *A01C 7/046* (2013.01)

(58) Field of Classification Search
CPC .............................. A01C 7/046; A01C 7/0443
See application file for complete search history.

(56) References Cited

U.S. PATENT DOCUMENTS 691,877 A * 1/1902 Scott ..................... B07B 13/003 209/684
3,796,346 A * 3/1974 Ribouleau ............ A01C 7/0445 221/211

(Continued)

FOREIGN PATENT DOCUMENTS

CN 102918966 A 2/2013
DE 3830588 A1 3/1989

(Continued)

*Primary Examiner* — Jamie L McGowan
(74) *Attorney, Agent, or Firm* — COATS & BENNETT, PLLC

(57) ABSTRACT

A singulating device (171) for singulating granular material in an agricultural implement comprises a metering member (1714), which is movably arranged in a meter chamber (1710) and which presents a plurality of through holes (1715, 1715*a*, 1715*b*), which are arranged along a direction of movement of the metering member (1714). The through holes (1715, 1715*a*, 1715*b*) are provided as at least one first row of holes and at least one second row of holes (1715, 1715*a*, 1715*b*), said rows of holes extending in parallel along the direction of movement. The rows of holes (1715, 1715*a*, 1715*b*) are spaced from each other in a direction perpendicular to the direction of movement. The singulating device (171) is connectable to a pressurization device (16), for providing a pressure difference across the metering member (1714), sufficient to cause granules of the material to attach to the metering member (1714) at the holes (1715, 1715*a*, 1715*b*). The singulating device comprises an excess material pickup prevention device (17161, 17162, 17163). The excess material pickup prevention device (17161, 17162, 17163) is operable only in an area radially between said rows of holes (1715*a*, 1715*b*). There is disclosed an agricultural implement comprising such singulating device and a method of operating a singulating device.

20 Claims, 7 Drawing Sheets

(56) References Cited

U.S. PATENT DOCUMENTS

| | | | | |
|---|---|---|---|---|
| 4,688,698 | A * | 8/1987 | Holland | A01C 7/046<br>221/211 |
| 4,793,511 | A * | 12/1988 | Ankum | A01C 7/0445<br>221/254 |
| 4,924,786 | A * | 5/1990 | Keeton | A01C 7/04<br>221/277 |
| 4,949,869 | A * | 8/1990 | Ribouleau | A01C 7/046<br>221/211 |
| 5,170,909 | A * | 12/1992 | Lundie | A01C 7/046<br>221/266 |
| 5,535,917 | A * | 7/1996 | Ribouleau | A01C 7/046<br>221/211 |
| 6,273,010 | B1 * | 8/2001 | Luxon | A01C 7/04<br>221/254 |
| 6,564,730 | B2 * | 5/2003 | Crabb | A01C 7/0443<br>111/900 |
| 7,093,548 | B2 * | 8/2006 | Eben | A01C 7/0443<br>111/185 |
| 9,360,121 | B2 * | 6/2016 | Garner | F16K 3/0254 |
| 9,578,798 | B2 * | 2/2017 | Scheideler | A01C 7/20 |
| 10,863,665 | B2 * | 12/2020 | Sauder | A01C 7/105 |
| 11,134,605 | B1 * | 10/2021 | Pirani | A01C 7/082 |
| 2016/0157416 | A1 | 6/2016 | Zumdome | |
| 2019/0239425 | A1 | 8/2019 | Garner et al. | |
| 2019/0364720 | A1 | 12/2019 | Garner et al. | |

FOREIGN PATENT DOCUMENTS

| | | | |
|---|---|---|---|
| DE | 102013100118 | B3 | 6/2014 |
| EP | 2901836 | A1 | 5/2015 |
| EP | 3735813 | A1 | 11/2020 |
| WO | 2014113803 | A1 | 7/2014 |
| WO | 2015069179 | A1 | 5/2015 |

* cited by examiner

SINGULATOR FOR AGRICULTURAL IMPLEMENT, AGRICULTURAL IMPLEMENT AND METHOD OF OPERATING A SINGULATOR

TECHNICAL FIELD

The present disclosure relates to a singulator for an agricultural implement, to an agricultural implement comprising such singulator and to a method of operating a singular for singulating granular material in an agricultural implement.

BACKGROUND

In the field of agriculture, there are generically two types of implements for distributing seeds to ground over which the implement is caused to move: seeders and planters.

A seeder is a device which outputs a specific volume of seeds per area of ground covered by the implement. Hence, the seeds are basically distributed as a bulk flow of seeds, without any control over the individual seeds. Seeders are traditionally used for crops such as wheat, oat, barley and ye.

By contrast, a planter is a device, which controls each individual seed, in order to place each seed in a desired position relative to other seeds. Planters are typically used for crops such as corn and soybean.

It is well known to use singulators in agricultural planters in order to achieve accurate planting of the seeds.

There is, however, a desire to increase the precision in the amount of seeds output to the ground also in seeders. However, as the crops for which seeders are used are typically positioned much more densely, the singulators developed for planters do not have the capacity to achieve optimum density for such crops.

EP3735813A1 discloses the concept of using a planter singulator, in which a metering member presents several rows of through holes. In order to prevent an excessive amount of seeds from being carried by the metering member, brushes are provided, which extend across the rows of through holes.

However, the brushes disclosed in EP3735813A1 are likely to remove too many seeds from the metering member.

Hence, there is a need for an improved method of ascertaining that only the desired amount of seeds is conveyed by the metering member to the seed outlet.

SUMMARY

It is an object of the present disclosure to provide an improved singulating device, and in particular a singulating device that ensures that the right amount of seeds is being output by the singulating device.

The invention is defined by the appended independent claims, with embodiments being set forth in the appended dependent claims, in the following description and in the attached drawings.

According to a first aspect, there is provided a singulating device for singulating granular material in an agricultural implement, comprising a metering member, which is movably arranged in a meter chamber and which presents a plurality of through holes, which are arranged along a direction of movement of the metering member. The through holes are provided as at least one first row of holes and at least one second row of holes, said rows of holes extending in parallel along the direction of movement. The rows of holes are spaced from each other in a direction perpendicular to the direction of movement. A pressurization device, is arranged for providing a pressure difference across the metering member, sufficient to cause granules of the material to attach to the metering member at the holes. The singulating device comprises an excess material pickup prevention device. The excess material pickup prevention device is operable only in an area radially between said rows of holes.

By providing the interference device to operate only in the area between the rows, the risk of it eliminating seeds that have been duly picked up by the holes is reduced.

The excess material pickup prevention device may comprise a continuous ridge arranged on the metering member radially between said rows of holes.

The ridge being continuous means that its cross section is effectively constant.

The holes may be formed as recesses in a surface of the metering member and wherein the ridge extends out of said surface.

The ridge may present a radial extent which is 20-70% of a radial distance between centers of holes.

The ridge may have a cross section, which slopes radially outwardly and radially inwardly.

The ridge may present a height relative to the metering member corresponding to 10-50%, preferably 10-30% of a major dimension of the granules for which the metering member is predetermined.

The excess material pickup prevention device may comprise an interference device which extends towards the metering member.

The interference device may have an elongate cross section presenting a length and a width.

The interference device may be mounted pivotably about an axis that is perpendicular to the cross section.

The interference device may be provided in the form of a brush, a scraper, a pin or any similar type of rigid or flexible device that is operable to interfere with, such as poke or nudge, a granule that has become stuck between the rows.

The length of the cross section may be shorter than a distance by which the rows of holes are spaced from each other in the direction perpendicular to the direction of movement.

The length of the cross section may be shorter than the distance by which the rows of holes are spaced from each other less a maximum diameter of one of the holes.

The length of the cross section may be 20-80%, preferably 30-70% or 40-60% of the distance by which the rows of holes are spaced from each other in the direction perpendicular to the direction of movement.

The singulating device may further comprise an actuator, which is operatively connected to the interference device, for controlling a relative position of the interference device and the metering member.

The singulating device may further comprise, or be connected to, a controller and a material sensor configured for providing an indication of an amount or rate of material output by the singulating device, wherein the material sensor and the actuator are connected to the controller, and wherein the controller is configured to control the actuator based on a signal from the material sensor.

The interference device may comprise a brush having bristles, which extend from a brush base towards the metering member, so as to interfere with granules that are insufficiently attached to the metering member.

The singulating device may be connected to a source of pressurized air, providing an air pressure greater than ambient air pressure.

The source of pressurized air may be connected to a material inlet of the singulating device and/or to an air inlet. The pressurized air may operate to provide the pressure drop over the metering member and/or to propel material out of the singulating device.

According to a second aspect, there is provided an agricultural implement for dispensing granular material to ground which is traversed by the agricultural implement, comprising a frame, and a plurality of output units, connected to the frame, each of which comprising at least one singulating device as described above.

According to a third aspect, there is provide a method of operating a singulating device, comprising a metering member, which is movably arranged in a meter chamber and which presents a plurality of through holes, which are arranged along a direction of movement of the metering member, wherein the through holes are provided as at least one first row of holes and at least one second row of holes, said rows of holes extending in parallel along the direction of movement, said rows of holes being spaced from each other in a direction perpendicular to the direction of movement. The method comprises providing a pressure difference across the metering member, sufficient to cause granules of the material to attach to the metering member at the holes, and preventing excessive material from being picked up by providing an excess material pickup prevention device that is operable only in an area radially between said rows of holes.

In the method, preventing excessive material from being picked up may comprise providing a continuous ridge radially between the rows of holes.

In the method, preventing excessive material from being picked up may comprise providing an interference device which extends towards the metering member.

The method may further comprise tuning an action of the excess material pickup prevention device by rotating the excess material pickup prevention device about an axis, which crosses a surface of the metering member.

The method may further comprise detecting an amount or rate of material output by the singulating device and tuning an action of the excess material pickup prevention device based on said amount or rate of material output, preferably by rotating the excess material pickup prevention device about an axis, which crosses a surface of the metering member.

DETAILED DESCRIPTION

Figure 1A:
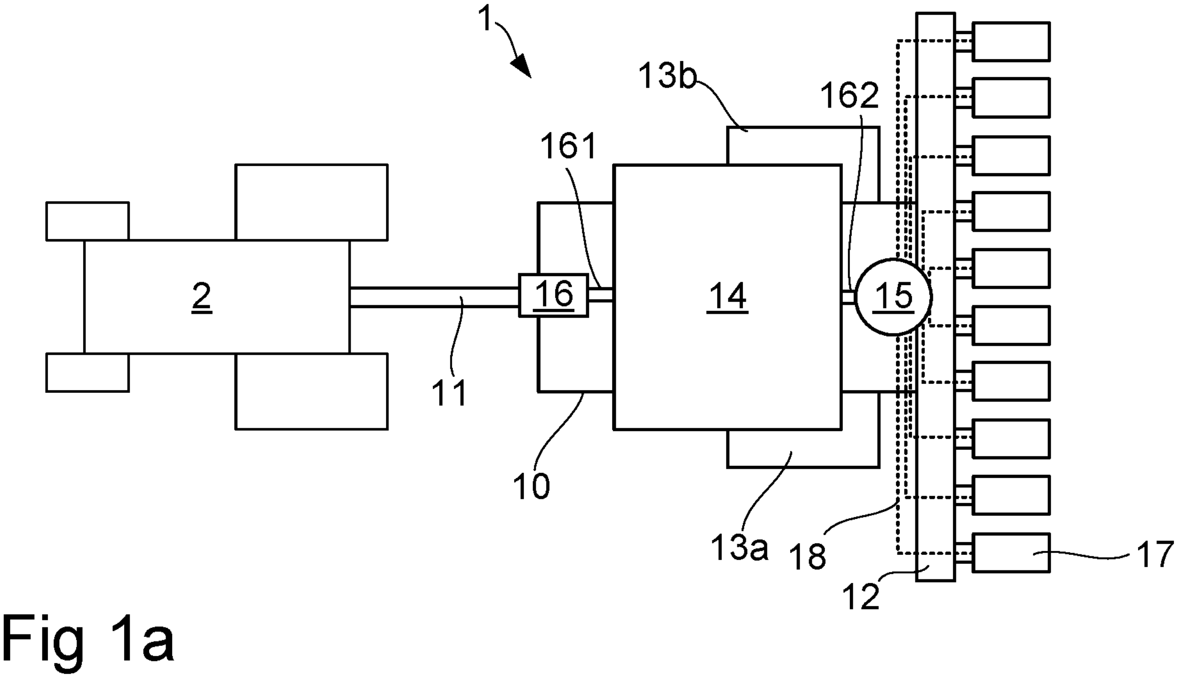
FIGS. 1*a*-1*b* schematically show an agricultural implement 1, coupled to a traction vehicle 2.
Figure 1B:
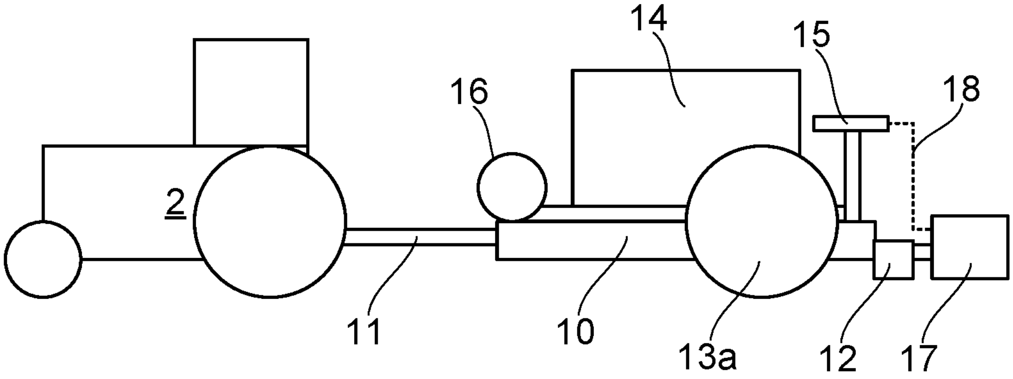

FIGS. 1*a*-1*b* show a rig comprising an agricultural implement 1, which is coupled to a traction vehicle 2, which is illustrated in the form of a tractor.

The agricultural implement 1 is illustrated in the form of a seed drill, which in FIGS. 1*a*-1*b* consists of a volumetrically fed seed drill.

The agricultural implement 1 has a main frame 10, to which a drawbar 11 and at least one transversely extending part 12 are connected. The main frame 10, the drawbar 11 and the transversely extending part 12 can be fixedly arranged relative to each other. One, two or more wheels 13*a*, 13*b* may be arranged to fully or partially support the agricultural implement 1. Alternatively, two or more of the parts 10, 11, 12 may be movably mounted relative to each other. Specifically, the transversely extending part 12 may comprise one, two, three, four or five relative toe each other movable portions, which may be arranged so that the transversely extending part 12 can be folded between a working position with a large width and a transport position with a small width.

The main frame 10 can carry one or more containers 14 for the material to be distributed, a fan 16 for generating an air flow which can be led in a primary duct 161, 162, via a feeder for feeding from the container, to a distributor 15, in which the material-laden air flow, via secondary ducts 18 is distributed to a plurality of output units 17.

In a second embodiment of a device for distributing granular material, the agricultural implement, instead of a drivable feeder for volumetric feeding, may have a passive feed in the form of a take-up zone, to which the air flow from the fan 16 is directed, so that material falling down in the take-up zone is carried by the air flow and thus forms a material-mixed air flow. A plurality of such take-up zone may be arranged at the bottom of the container 14, for example next to each other, and are connected to each of a plurality of the secondary channels 18, which lead to a respective output unit 17. This provides a robust, but not controlled, supply of material to the output units 17.

Each output unit, may comprise a unit frame, which may be movably connected to the transversely extending part 12 in a manner known per se. The unit frame may be connected to the transversely extending part through a parallel linkage mechanism with an actuator for controlling a ground force provided by the output unit.

The output unit may further comprise a furrow opener and a gauge wheel, the relative positions of which may be adjustable. The singulating device 171 may be carried by the unit frame its outlet may be connected to a material outlet, which may have the form of a tube, a hose or a seed knife, which may be positioned such that it is protected by the furrow opener.

The output unit may further comprise a press wheel, for pressing the dispensed material into contact with the ground and a closing device for closing the furrow opened by the furrow opener.

Optionally, further tools may be provided on each output unit. For example, one or more a cleaner devices may be arranged upstream of the furrow opener and a fertilizer knife may be provided downstream of the press wheel and upstream of the closing device.

Figure 2:
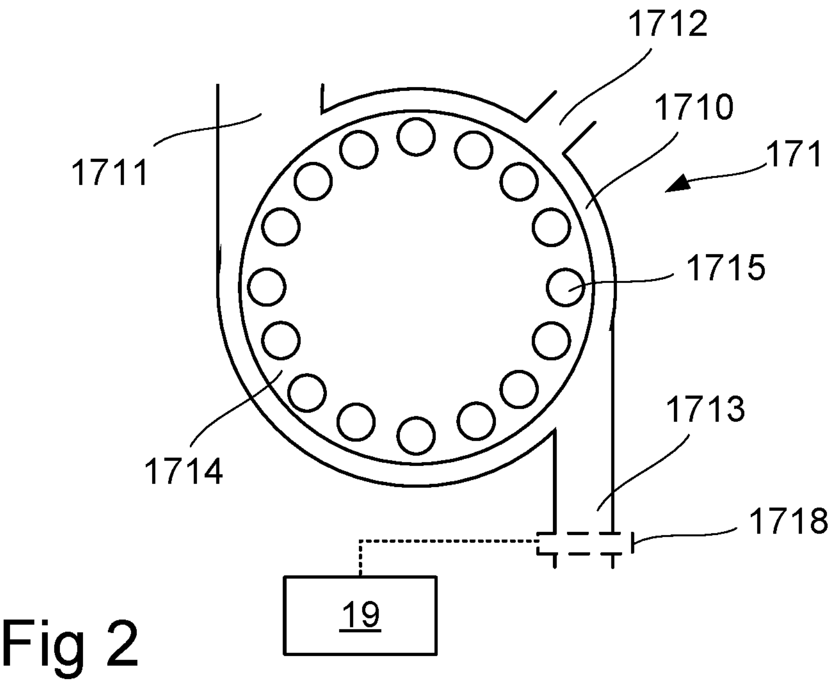
FIG. 2 schematically shows a singulation device.

FIG. 2 schematically shows a singulation device 171.

The singulation device 171 comprises a singulation chamber 1710, which has a material inlet 1711, an air inlet 1712 and an outlet 1713 for singulated material. In the singulation chamber 1710, a singulation part 1714, which is shown here in the form of a singulation disc, is movably arranged. The singulation part 1714 has a plurality of through holes 1715 which have slightly smaller cross-sections than the size of the material to be singled. By means of air supplied to the air inlet 1712 creating a pressure difference across the singulation part 1714 and allowing the high pressure side of the singulation part 1714 to move in a part of the singulation space 1710 to which material is fed via the material inlet 1711, material will stick to the holes 1715 and be carried by the singulation part 1714 to the outlet 1713, where the pressure difference is temporarily broken, so that the material falls into the outlet 1713. By providing the singulator with a sufficiently large air flow, the part of the air flow which does not pass through the singulation part 1714 is led through the outlet 1713 and there will assist to accelerate and propel the material.

The metering member 1714 can be formed with a circular disc or ring, which is rotatable about an axis perpendicular to the disc, the holes being in the base surface of the disc or ring.

Alternatively, the singulation part can be formed as a cylinder, which is rotatable about a center axis of the cylinder, the holes being present in the circumferential surface of the cylinder.

Figure 3A:
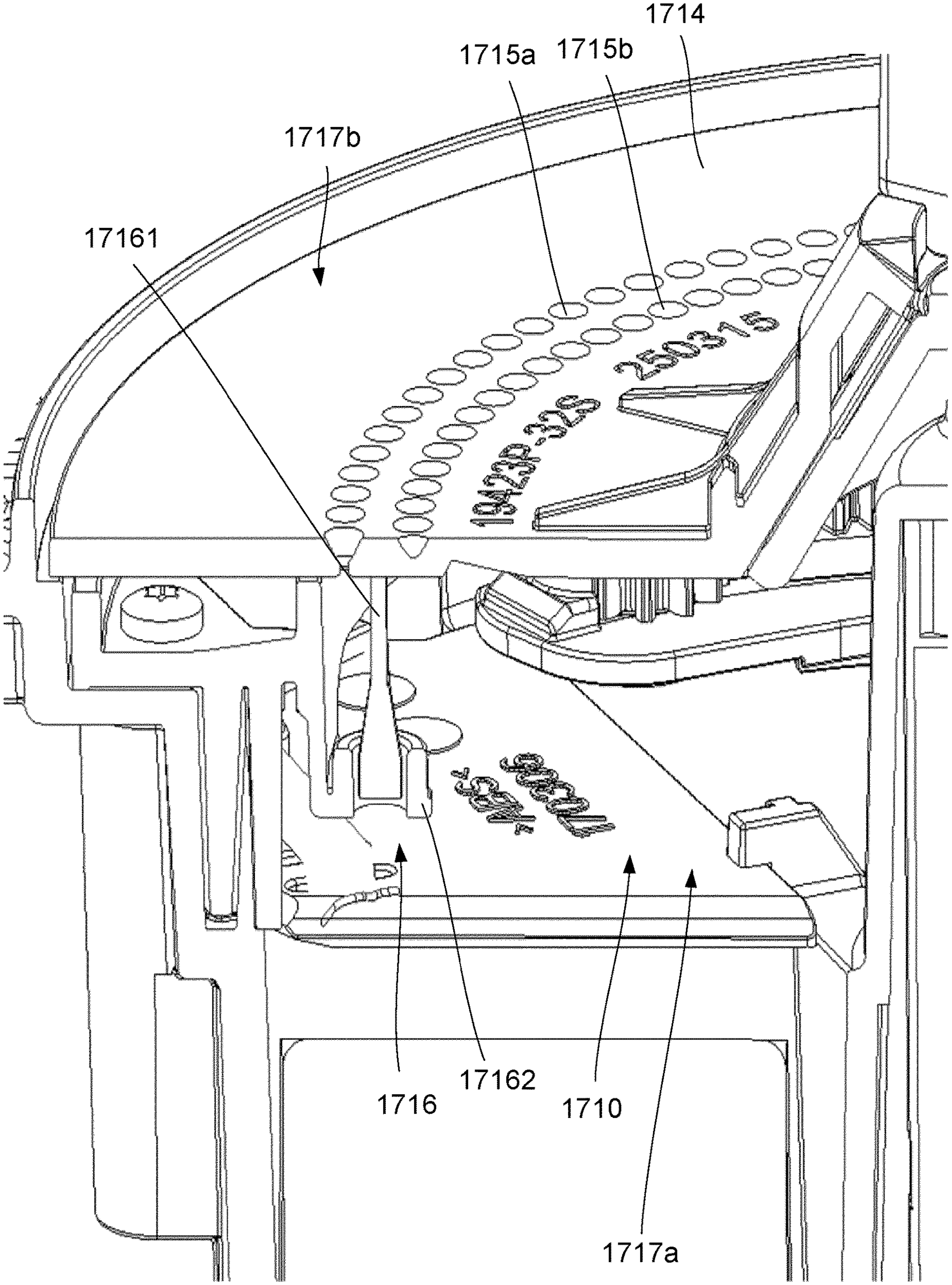
FIGS. 3*a*-3*e* schematically illustrate an embodiment of a singulating device.

Referring to FIG. 3*a*, there is illustrated a partial perspective sectional view of a singulator 171, wherein the metering member 1714 is formed as a rotatable disc with two concentric rows of through holes 1715*a*, 1715*b*, an interference device 1716 having a brush part 17161 and a base 17162.

With reference to FIG. 3*a*, the metering member 1714 will have a high pressure side 1717*a* and a low pressure side 1717*b*, with the material and pressurized air being supplied to the high pressure side 1717*a*, such that a pressure difference is provided over the metering member 1714 causing material to be picked up by the holes 1715*a*, 1715*b* and held by the pressure difference while the metering member rotates, typically in a vertical plane, with a substantially horizontally extending axis of rotation, such that the material is picked up and transported to the material outlet 1713 (FIG. 2).

Figure 3B:
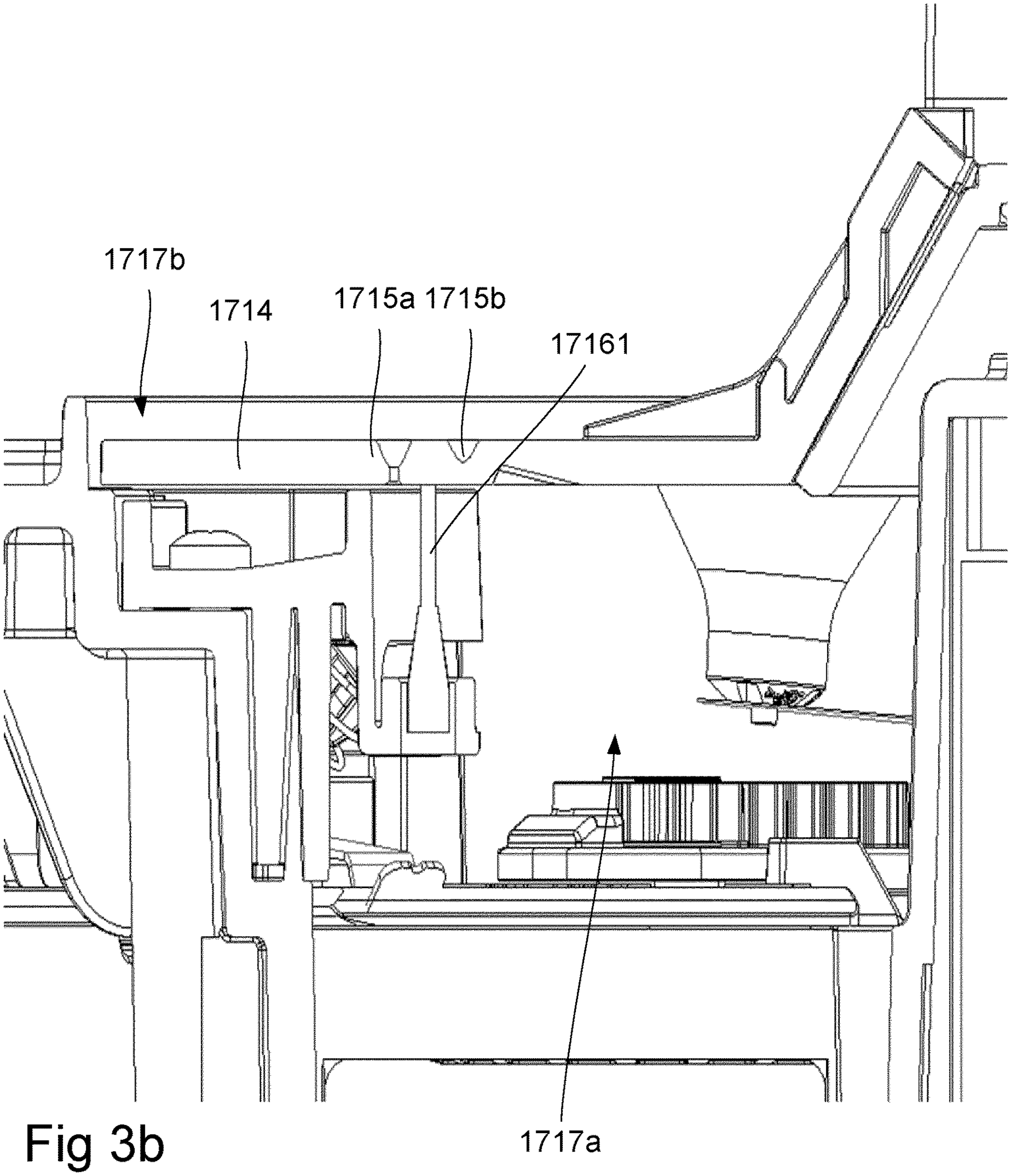
Figure 3C:
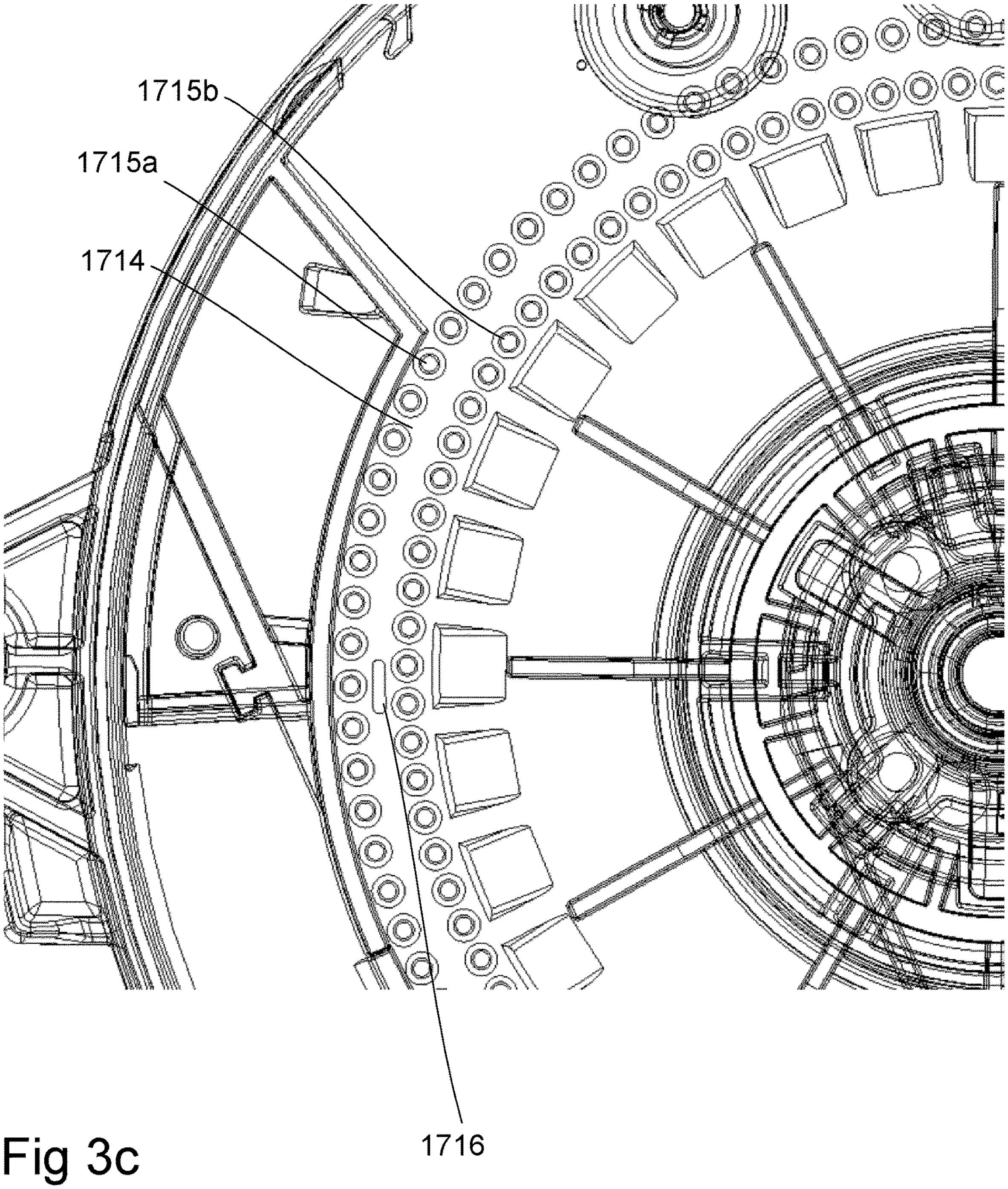

In the device shown in FIGS. 3*a*-3*c*, the metering member 1714 has two concentrically arranged rows of holes 1715*a*, 1715*b*, which increases the capacity of the singulator as compared to a metering member having only one row. It is understood that more than two rows, such as 2-6 rows or 2-4 rows, may be provided.

With two rows that are closely spaced, there is a risk that additional material may be drawn along by the metering member by piling onto adjacent pieces of material, which are attached to adjacent inner and outer holes 1715*a*, 1715*b*.

Hence, an interference device 1716 is provided to interfere with material that is loosely piled between the rows of holes 1715*a*, 1715*b*.

The interference device may comprise a brush 17161 having a plurality of bristles, which are arranged substantially in parallel and which extend at an angle of about 45-90 degrees, preferably 75-90 degrees, to the surface of the metering member.

The bristles may extend such that they lightly touch the surface of the metering member 1714, or their ends may be slightly spaced from the surface of the metering member 1714. Such spacing may be less than the dimensions of the seeds.

Alternatively, the interference device 1716 may be formed as a scraper, which is formed from a resilient and elastic material, such as a rubber-like material, e.g. thermoplastic elastomer or silicone type rubber.

Figure 3D:
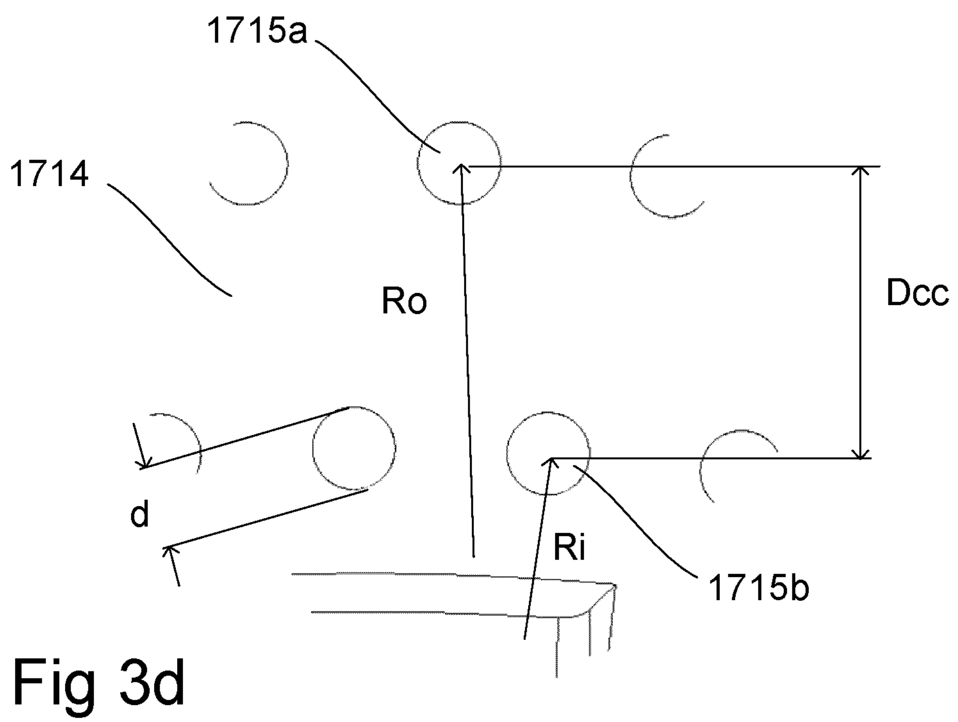

Referring to FIG. 3*d*, there is illustrated a detail of the metering member 1714 from FIGS. 3*a*-3*c*. Based on FIG. 3*d*, it is understood that each row of holes 1715*a*, 1715*b* is situated at a fixed distance Ro, Ri from a center of the metering member 1714. It is also understood that there is a radial distance Dcc between the hole rows, as defined by the center to center distance of the holes 1715*a*, 1715*b*. Finally, it is understood that each hole 1515*a*, 1515*b* has a hole dimension d in the radial direction, although it is understood that a hole need not be circular in cross section.

Figure 3E:
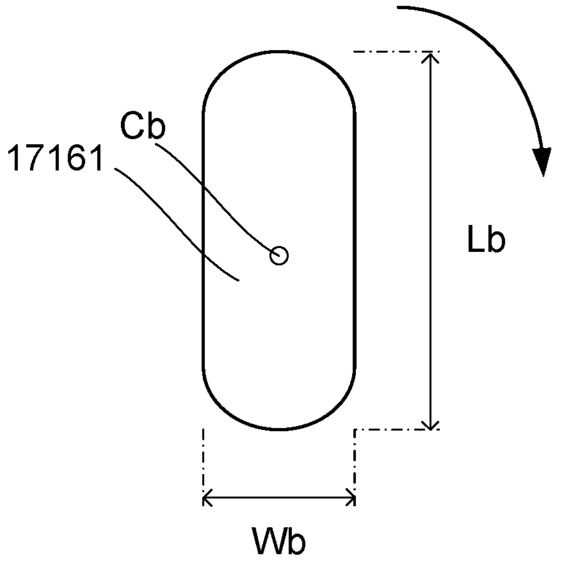

Referring to FIG. 3*e*, there is illustrated a cross sectional view of the brush 17161, whereby it is defined that the brush 17161 may have an elongate cross section with a major side length Lb and a minor side length Wb. The exact shape of the brush 17161 may be approximately rectangular, possibly with rounded sides or corners.

The interference device 1716 may be rotatable about an axis Cb which extends parallel to the bristles of the brush and thus at the angle to the metering member 1714.

In some embodiments, the interference device 1716 may be manually rotatable, e.g. by manipulation of a lever.

In other embodiments, the interference device 1716 may be rotatable by means of an actuator, which, in turn, may be controllable by a controller 19 of the agricultural implement 1.

In various embodiments, the interference device may have a cross section major length Lb which is less than the radial distance Dcc between the rows of holes 1715*a*, 1715*b*.

Preferably, the major length Lb may be less than said radial distance Dcc less the radial dimension d of the holes, such that the interference device only works between the rows of holes.

In further embodiments, the major length Lb may be 20-80% of the radial distance Dcc less, preferably 30-70% or 40-60%.

It is possible to provide a sensor 1718 at the material outlet 1713 of the singulator 171 for determining the amount of material output by the singulator. The controller 19 may be configured to adjust the interference device 1716 by causing it to rotate about the axis Cb based on the sensor input, such until it reaches an angle that provides a desired flow of material.

The bristles of the brush 17161 may extend such that they lightly touch the surface of the metering member 1714, or their ends may be slightly spaced from the surface of the metering member 1714. Such spacing may be less than the minor dimension of the seeds.

In particular embodiments, ends of the bristles forming the brush may be spaced by a distance which is 10-150% of the radial dimension d of the holes.

Figure 4:
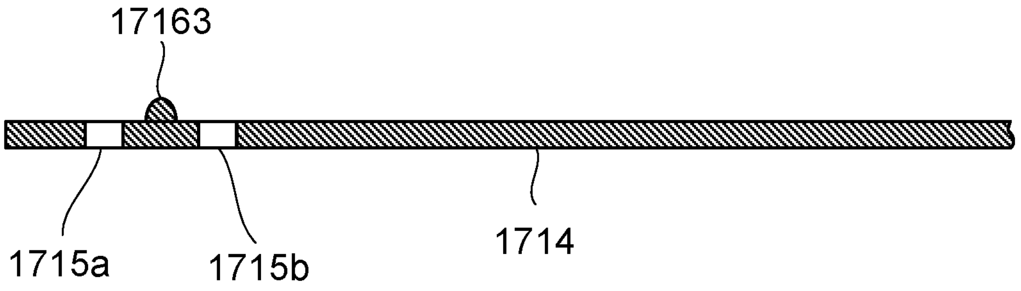
FIG. 4 schematically illustrates a cross sectional view of a metering member.

Referring to FIG. 4, there is schematically illustrated another version of a device 17163 for preventing excess material pickup.

The device illustrated in FIG. 4 comprises a ridge, which extends all or some of the radial distance between the rows of holes 1715*a*, 1715*b* on the high pressure side of the metering member 1714. The ridge may be substantially continuous about the circumferential direction of the metering member 1714 and it may have a substantially constant cross section.

The cross section may be more or less pointed.

The ridge may present a radial extent which may be 20-70% of a radial distance between the centers of the holes 1715*a*, 1715*b*.

An out of plane height of the ridge may be on the order of 10-50%, preferably 10-30%, of a major dimension of the granules for which the metering member is intended.

Hence, an effect of the ridge is to prevent that a pair of seeds which have been attached at adjacent holes 1715*a*, 1715*b* provide a shelf for one or more additional seeds.

The ridge may be integrated with the metering member 1714.

Alternatively, the ridge may be releasably mounted to the metering member, e.g. such that ridges having different heights may be mounted, if desired.

It is also possible to combine a metering member provided with a ridge with an interference device, such as a brush.

The invention claimed is:

1. A singulating device for singulating granular material in an agricultural implement, comprising:

a metering member, which is movably arranged in a meter chamber and which presents a plurality of through holes, which are arranged along a direction of movement of the metering member, wherein the through holes are provided as at least one first row of holes and at least one second row of holes, said rows of holes extending in parallel along the direction of movement, said rows of holes being spaced from each other in a direction perpendicular to the direction of movement, said singulating device being connectable to a pressurization device, for providing a pressure difference across the metering member, sufficient to cause granules of the material to attach to the metering member at the holes, and an excess material pickup prevention device, wherein the excess material pickup prevention device is operable only in an area radially between said rows of holes.

2. The singulating device as claimed in claim 1, wherein the excess material pickup prevention device comprises a continuous ridge arranged on the metering member radially between said rows of holes.

3. The singulating device as claimed in claim 2, wherein the holes are formed as recesses in a surface of the metering member and wherein the ridge extends out of said surface.

4. The singulating device as claimed in claim 2, wherein the ridge presents a radial extent which is 20-70% of a radial distance between centers of holes.

5. The singulating device as claimed in claim 2, wherein the ridge has a cross section, which slopes radially outwardly and radially inwardly.

6. The singulating device as claimed in claim 2, wherein the ridge presents a height relative to the metering member corresponding to 10-50% of a major dimension of the granules for which the metering member is predetermined.

7. The singulating device as claimed in claim 1, wherein the excess material pickup prevention device is formed as an interference device which extends towards the metering member.

8. The singulating device as claimed in claim 7, wherein the interference device has an elongate cross section presenting a length and a width, wherein the interference device is mounted pivotably about an axis that is perpendicular to the cross section.

9. The singulating device as claimed in claim 7, wherein the interference device has an elongate cross section presenting a length and a width, wherein the length of the cross section is shorter than a distance by which the rows of holes are spaced from each other in the direction perpendicular to the direction of movement.

10. The singulating device as claimed in claim 7, wherein the interference device has an elongate cross section presenting a length and a width, wherein the length of the cross section is shorter than the distance by which the rows of holes are spaced from each other less a maximum diameter of one of the holes.

11. The singulating device as claimed in claim 7, wherein the interference device has an elongate cross section presenting a length and a width, wherein the length of the cross section is 20-80% of the radial distance by which the rows of holes are spaced from each other.

12. The singulating device as claimed in claim 7, further comprising an actuator, which is operatively connected to the interference device, for controlling a relative position of the interference device and the metering member, the singulating device further comprising, or connected to, a controller and a material sensor configured for providing an indication of an amount or rate of material output by the singulating device, wherein the material sensor and the actuator are connected to the controller, and wherein the controller is configured to control the actuator based on a signal from the material sensor.

13. The singulating device as claimed in claim 7, wherein the interference device comprises a brush having bristles, which extend from a brush base towards the metering member, so as to interfere with granules that are insufficiently attached to the metering member.

14. The singulating device as claimed in claim 1, wherein the singulating device is connected to a source of pressurized air, providing an air pressure greater than ambient air pressure.

15. A method of operating a singulating device, comprising:

a metering member, which is movably arranged in a meter chamber and which presents a plurality of through holes, which are arranged along a direction of movement of the metering member, wherein the through holes are provided as at least one first row of holes and at least one second row of holes, said rows of holes extending in parallel along the direction of movement, said rows of holes being spaced from each other in a direction perpendicular to the direction of movement, wherein the method comprises:

providing a pressure difference across the metering member, sufficient to cause granules of the material to attach to the metering member at the holes, and preventing excessive material from being picked up by providing an excess material pickup prevention device that is operable only in an area radially or only in an area axially between said rows of holes.

16. The method as claimed in claim 15, wherein preventing excessive material from being picked up comprises providing a continuous ridge radially between the rows of holes.

17. The method as claimed in claim 15, further comprising tuning an action of the excess material pickup prevention device by rotating the excess material pickup prevention device about an axis, which crosses a surface of the metering member.

18. The method as claimed in claim 15, further comprising detecting an amount or rate of material output by the singulating device and tuning an action of the excess material pickup prevention device based on said amount or rate of material output, which crosses a surface of the metering member.

19. A singulating device for singulating granular material in an agricultural implement, comprising:

a metering member, which is movably arranged in a meter chamber and which presents a plurality of through holes, which are arranged along a direction of movement of the metering member, wherein the metering member is formed as a cylinder, which is rotatable about a center axis of the cylinder, the holes being present in the circumferential surface of the cylinder, wherein the through holes are provided as at least one first row of holes and at least one second row of holes, said rows of holes extending in parallel along the direction of movement, said rows of holes being spaced from each other in a direction perpendicular to the direction of movement, said singulating device being connectable to a pressurization device, for providing a pressure difference across the metering member, sufficient to cause granules of the material to attach to the metering member at the holes, and an excess material pickup prevention device, wherein the excess material pickup prevention device is operable only in an area axially between said rows of holes.

20. An agricultural implement for dispensing granular material to ground which is traversed by the agricultural implement, comprising:

a frame, and a plurality of output units, connected to the frame, each of which comprising at least one singulating device as claimed in claim 1 or 19.

* * * * *